United States Patent
Solanki et al.

(10) Patent No.: US 10,965,078 B2
(45) Date of Patent: Mar. 30, 2021

(54) GRIPPER HEAD FOR USE WITH TERMINAL SEALS

(71) Applicant: TE CONNECTIVITY CORPORATION, Berwyn, PA (US)

(72) Inventors: Swapnilsinh Solanki, Harrisburg, PA (US); Sun Kyu Pak, Harrisburg, PA (US)

(73) Assignee: TE Connectivity Corporation, Berwyn, PA (US)

( * ) Notice: Subject to any disclaimer, the term of this patent is extended or adjusted under 35 U.S.C. 154(b) by 96 days.

(21) Appl. No.: 16/171,412

(22) Filed: Oct. 26, 2018

(65) Prior Publication Data
US 2020/0136329 A1 Apr. 30, 2020

(51) Int. Cl.
*H01R 43/00* (2006.01)
*B25J 15/00* (2006.01)

(52) U.S. Cl.
CPC ........ *H01R 43/005* (2013.01); *B25J 15/0047* (2013.01)

(58) Field of Classification Search
CPC ...... B25J 15/0047; B25J 15/10; B25J 15/103; B25J 15/12; H01R 43/005; H01R 43/007; B23P 19/084; B23P 19/088; Y10T 29/536
USPC .............................. 294/93, 99.1; 29/222, 229
See application file for complete search history.

(56) References Cited

U.S. PATENT DOCUMENTS

| | | | | |
|---|---|---|---|---|
| 1,427,155 A * | 8/1922 | Haven | ..................... | B23B 31/06 279/2.03 |
| 1,469,493 A * | 10/1923 | Brown | ..................... | E21B 31/20 294/86.24 |
| 1,543,407 A * | 6/1925 | Tandy | ..................... | E21B 31/20 294/86.24 |
| 2,961,755 A * | 11/1960 | Prince | ..................... | B25B 27/28 29/235 |
| 4,203,191 A * | 5/1980 | Gibson, Sr. | ............. | B23P 11/02 277/610 |
| 5,090,102 A * | 2/1992 | Lovell | ..................... | B25B 27/06 29/255 |
| 5,387,389 A * | 2/1995 | Catalanotti | ......... | B29C 45/2618 249/59 |
| 6,722,011 B1 * | 4/2004 | Bacon | ................... | B23P 19/084 29/222 |
| 6,993,816 B2 * | 2/2006 | Greenhill | ............ | B25B 27/0028 29/229 |
| 8,458,875 B2 * | 6/2013 | Dalrymple | .............. | B25B 27/20 29/225 |

(Continued)

*Primary Examiner* — Dean J Kramer

(57) ABSTRACT

A gripper head for use in gripping a seal and positioning the seal in an electrical terminal. The gripper head has a mounting section, a compliant section and a gripping section. The compliant section extends from the mounting section. The compliant section has compliant legs having fixed ends proximate the mounting section and free ends. The compliant legs are spaced apart by compliant section slots. The gripping section extends from the compliant section. The gripping section has gripping legs which extend from the compliant legs. The gripping legs are spaced apart by gripping section slots. As the gripper head is moved into engagement with the seal, the gripping legs and the compliant legs are resiliently deformed causing the compliant legs and the gripping legs to apply a force to the seal to retain the seal on the gripping section of the gripper head.

10 Claims, 6 Drawing Sheets

(56) References Cited

U.S. PATENT DOCUMENTS 9,744,602 B2 * 8/2017 Chen .................. B23B 31/001
2015/0336277 A1 * 11/2015 Schanz ............ C10M 175/0033
                                                                               294/97

* cited by examiner

US 10,965,078 B2

GRIPPER HEAD FOR USE WITH TERMINAL SEALS

FIELD OF THE INVENTION

The invention is directed to a gripper head for use with terminal seals. In particular, the invention is directed to a gripper head picks up and inserts seals into terminals.

BACKGROUND OF THE INVENTION

Gripper heads for lifting an object, for example a connector, and positioning the object in a different location, for example on a printed circuit board, are known in the industry. Many such gripper heads have mechanical or pneumatic units to control gripper jaws or arms. The gripper jaws or arms are moved into engagement with outside surfaces of the object. Force is applied to the gripper jaws or arms to secure the object between the gripper jaws or arms, allowing the gripper head to pick up and transport the object to another location. Once properly moved to the location, the gripper head moves or inserts the object as required. Once properly moved or inserted, the gripper jaws or arms are retracted from the object, allowing the object to remain in the moved or inserted position.

The known gripper heads are well suited to lift and place objects which have outside or flat surfaces which are available to be accessed by the gripper jaws or arms. However, in situations in which the outside surfaces are not available during pick up or insertion, the use of such known gripper heads is not optimal. In addition, if the object to be lifted and inserted does not have stiff walls, known gripper heads have difficulty properly inserting the object. For example, when assembling a seal into a terminal, known gripper heads may be able to pick up the seal, but cannot insert the seal into the terminal due to the configuration and composition of the seal, the configuration of the terminal, or space constraints.

It would, therefore, be beneficial to provide gripper head or mechanism which can pick up and properly insert objects, such as seals, which do not have clear access to the outside surfaces during pick up or insertion or which require additional support during insertion. It would also be beneficial to provide a gripper head or mechanism which is simple to use and does not require expensive or large mechanisms to operate the gripper head or mechanism.

SUMMARY OF THE INVENTION

An embodiment is directed to a gripper head for use in gripping a seal and positioning the seal in an electrical terminal. The gripper head has a mounting section, a compliant section and a gripping section. The compliant section extends from the mounting section. The compliant section has compliant legs having fixed ends proximate the mounting section and free ends. The compliant legs are spaced apart by compliant section slots. The gripping section extends from the compliant section. The gripping section has gripping legs which extend from the compliant legs. The gripping legs are spaced apart by gripping section slots. As the gripper head is moved into engagement with the seal, the gripping legs and the compliant legs are resiliently deformed causing the compliant legs and the gripping legs to apply a force to the seal to retain the seal on the gripping section of the gripper head.

An embodiment is directed to a gripper head for use in gripping a seal and positioning the seal in an electrical terminal. The gripper head has a mounting section, a compliant section and a gripping section. The compliant section extends from the mounting section. The compliant section has compliant legs which have fixed ends proximate the mounting section and free ends. The fixed ends of the compliant legs are fixed relative to the mounting section and the free ends are movable relative to the mounting section. The gripping section extends from the compliant section. The gripping section has gripping legs which extend from the compliant legs. The gripping legs have push surfaces and rib engaging surfaces. The gripping legs are movable with the compliant legs and are movable relative to the mounting section. As the gripper head is moved into engagement with the seal, the gripping legs and the compliant legs are resiliently deformed causing the rib engaging portion to apply a force to the seal to retain the seal on the rib engaging portion of the gripping section of the gripper head.

An embodiment is directed to a method of picking up and inserting a seal into a terminal. The method includes: moving a gripper head into an opening of the seal; compressing compliant legs of the gripper head wherein a gripping section of the gripper head exerts a force on an interior surface of the opening of the seal to retain the seal on the gripping section of the gripper head; inserting the seal into a seal engaging portion of the terminal, wherein projections of the seal engaging portion cooperate with the seal to lockingly secure the seal in the seal engaging portion of the terminal; and removing the gripping section of the gripper head from the seal, wherein the force generated between the seal and the seal engaging portion of the terminal is greater than the force generated between the gripping section of the gripper head and the interior surface of the opening of the seal.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 2:
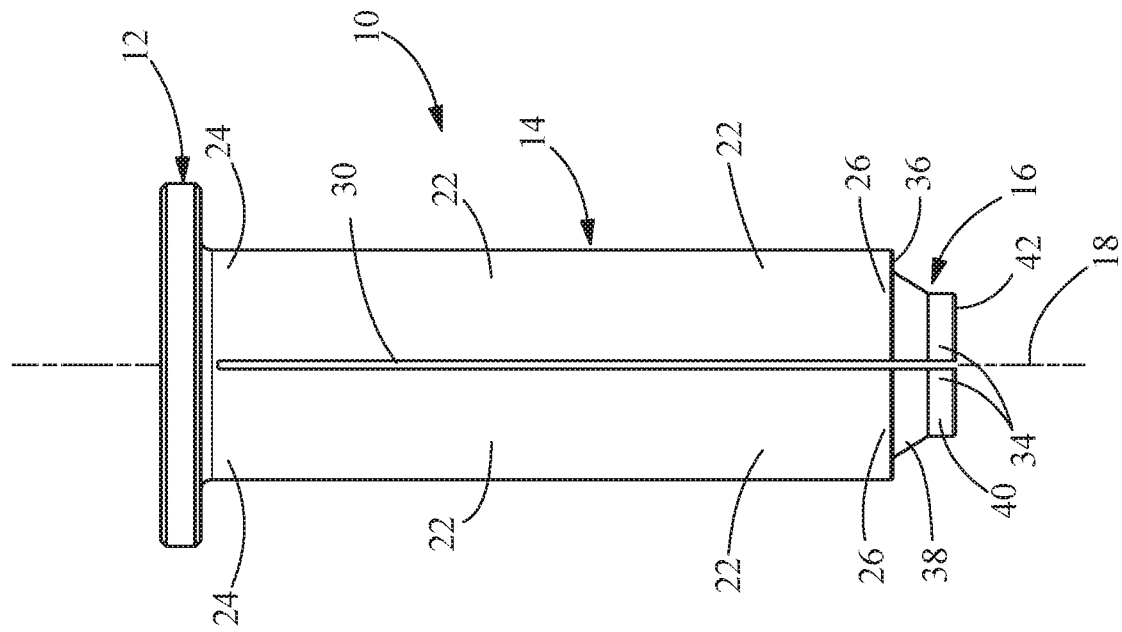
FIG. 2 is a side view of the gripper head of FIG. 1.
Figure 1:
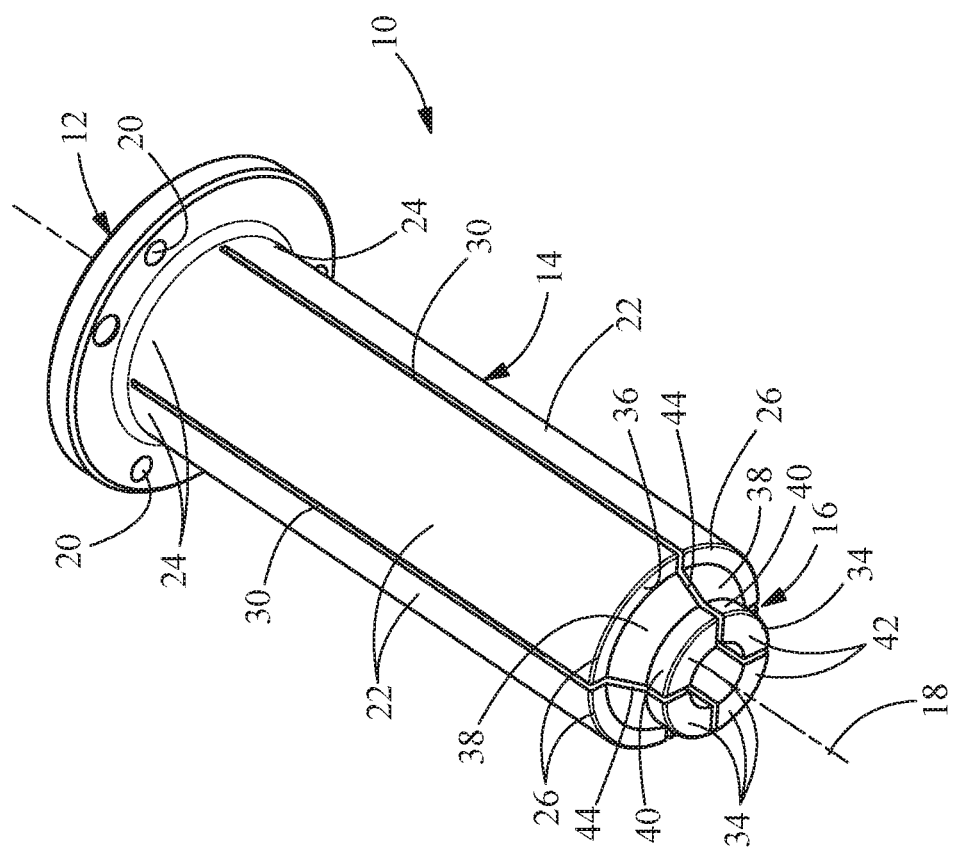
FIG. 1 is a perspective view of an illustrative embodiment of a gripper head according to the present invention.
Figure 3:
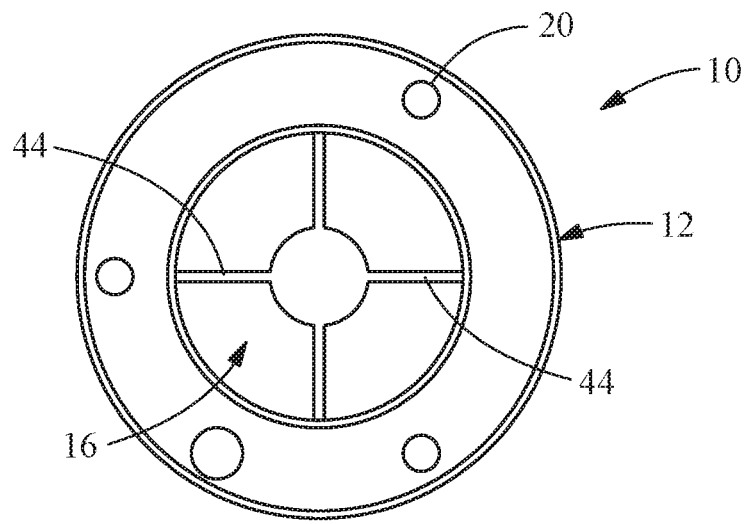
FIG. 3 is a top view of the gripper head of FIG. 1.
Figure 4:
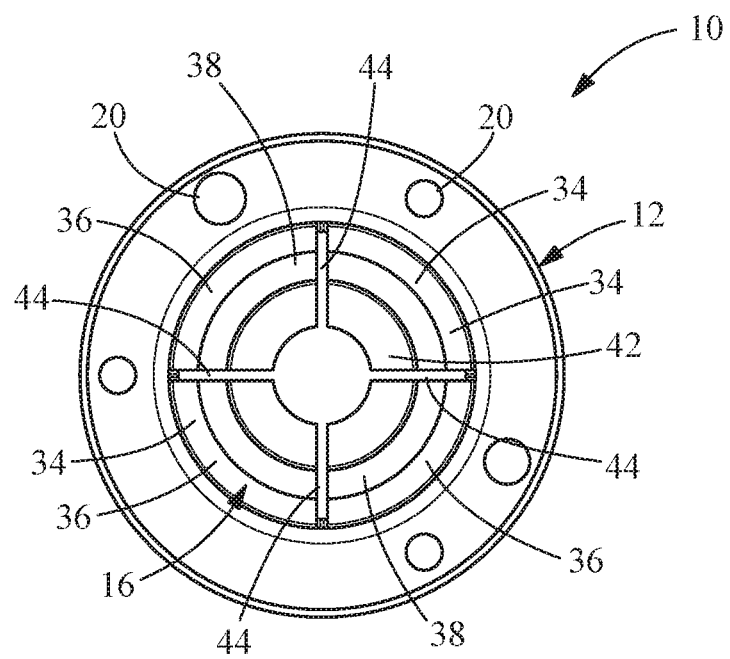
FIG. 4 is a bottom view of the gripper head of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

As shown in FIGS. 1 through 4, a gripper head 10 has a mounting section 12, a compliant section 14 and a gripping section 16. In the illustrative embodiment shown, the mounting section 12 is a circular member which can be attached to a device, such as, but not limited to, a robotic arm or gantry. The mounting section 12 may have mounting openings 20 to accept mounting hardware (not shown).

The compliant section 14 has compliant legs 22 which extend from fixed ends 24 position proximate the mounting section 12 to free ends 26 positioned proximate the gripping section 16. The fixed ends 24 are attached to the mounting section 12 and are fixed relative to the mounting section 12. The free ends 26 are movable relative to the mounting section 12. The free ends 26 move in a direction which is essentially transverse to a longitudinal axis 18 of the compliant section 14.

In the illustrative embodiment shown, the compliant section 14 has a general cylindrical configuration, with the diameter of the compliant section 14 being smaller than the diameter of the mounting section 12. Four compliant legs 22 make up the compliant section 14, although other number of compliant legs 22 may be used. In the embodiment shown, the compliant legs 22 are of equal size, but in other embodiments, the compliant legs 22 may not all be of equal size.

Compliant section slots 30 are provided between the compliant legs 22. The slots 30 extend from proximate the mounting section 12 to the free ends 26 of the compliant legs 22. In the embodiment shown, four slots 30 are provided and separate each of the compliant legs 22. The slots 30 separate each of the compliant legs 22 from the other compliant legs 22, allowing all of the compliant legs 22 to move independently. The amount of compliance of each leg 22 is dependent upon several factors, including, but not limited to, the gripping legs 34.

The gripping section 16 has gripping legs 34, with each gripping leg having a push surface 36, an angled surface 38, a rib engaging surface 40 and an end surface 42. The push surfaces 36 are attached to the compliant legs 22 and extend in a direction which is essentially transverse to a longitudinal axis 20 of the compliant section 14. The gripping legs 34 are movable with the compliant legs 22 and are movable relative to the mounting section 12. In addition, in various illustrative embodiments, depending upon the strength of the material, the gripping legs 34 may flex relative to the compliant legs 22 and/or portions of the gripping legs 34, for example the angled surfaces 38, may flex relative to other portions of the gripping legs 34.

In the illustrative embodiment shown, the rib engaging surfaces 40 of the gripping legs 34 of the gripping section 16 have a general cylindrical configuration, with the diameter of the rib engaging surfaces 40 being smaller than the diameter of the compliant section 14. Four gripping legs 34 make up the gripping section 16, although other number of gripping legs 34 compliant legs 22 may be used. The number of gripping legs 34 is equivalent to the number of compliant legs 22. In the embodiment shown, the gripping legs 34 are of equal size, but in other embodiments, the gripping legs 34 may not all be of equal size.

Gripping section slots 44 are provided between the gripping legs 34. The slots 44 extend from proximate the compliant section 14 to the end surfaces 42 of the gripping legs 34. In the embodiment shown, four slots 44 are provided and separate each of the gripping legs 34. However, in other embodiments, two, three or more than four slots may be provided. The slots 44 are extension of slots 30 and separate each of the gripping legs 34 from the other gripping legs 34, allowing all of the gripping legs 34 to move independently. The amount of movement of each of the gripping legs 34 is dependent upon several factors, including, but not limited to, the length of the compliant leg 22, the type of material used for the compliant leg 22 and the thickness of the compliant leg 22.

Figure 5:
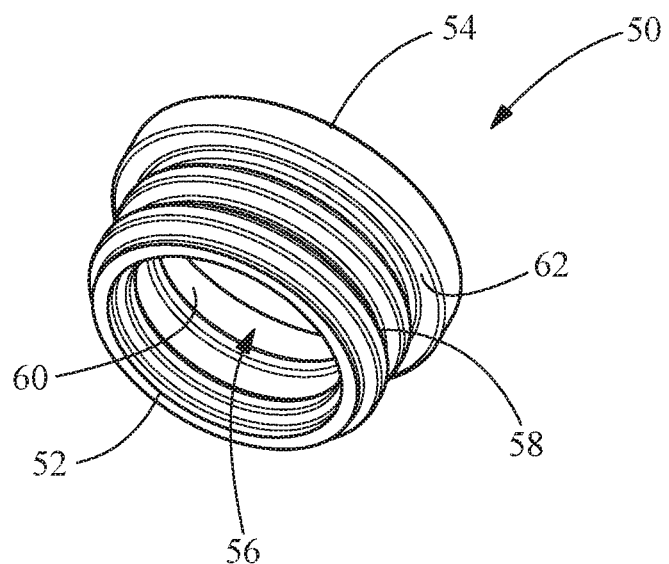
FIG. 5 is perspective view of an illustrative seal with which the gripper head of FIG. 1 can be used.
Figure 6:
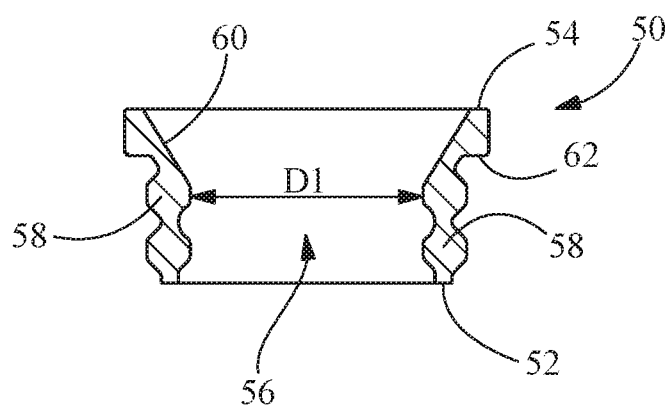
FIG. 6 is a cross-section view of the seal of FIG. 5.

Referring to FIGS. 5 and 6, an illustrative seal 50 is shown. The seal 50 has a first end 52 and an oppositely facing second end 54 with a conductor receiving opening 56 extending therethrough. A ribbed section 58 extends from the first end 52. An angled surface 60 extends from the ribbed section 58 to the second end 54. A terminal engagement shoulder 62 is provided proximate the second end 54. The interior diameter D1 of the ribbed section 58 (FIG. 6) is smaller than the diameter of the rib engaging surfaces 40 of the gripping legs 34 of the gripping section 16.

Figure 7:
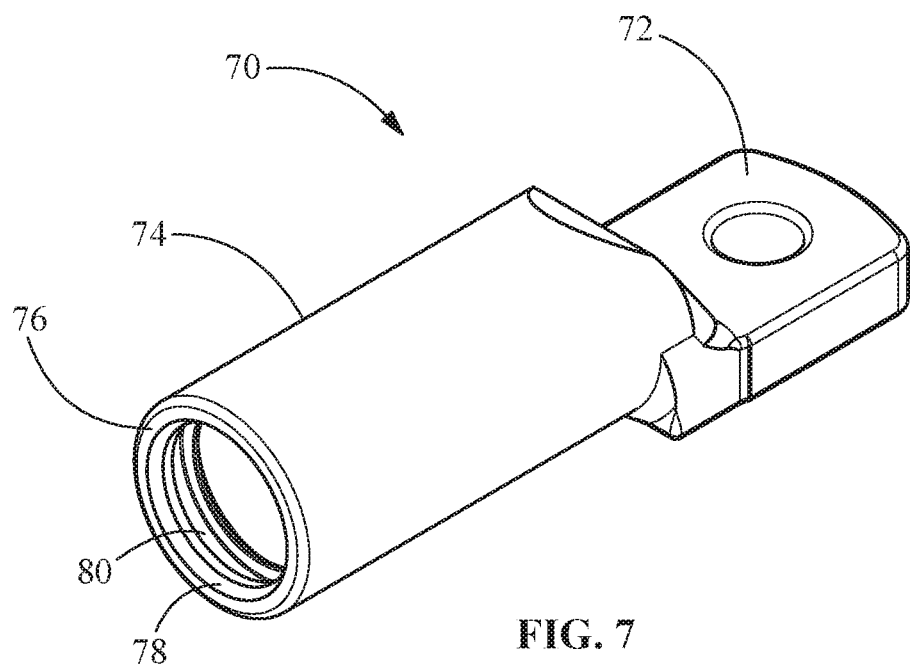
FIG. 7 is perspective view of an illustrative terminal in which the seal of FIG. 5 can be inserted.
Figure 8:
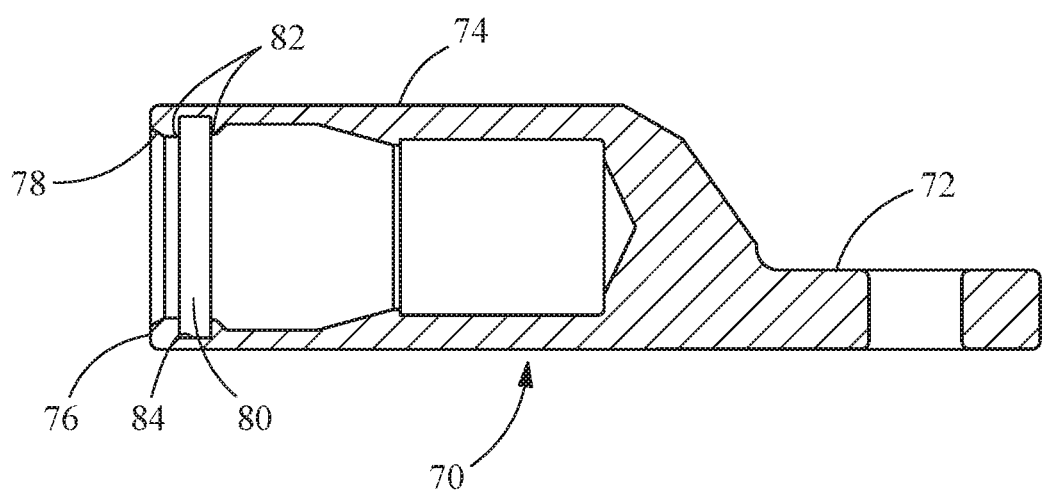
FIG. 8 is a cross-section view of the terminal of FIG. 7.

Referring to FIGS. 7 and 8, an illustrative terminal 70 is shown. The terminal 70 has a conductor receiving section 72 with seal engaging portion 74 position proximate an end surface 76. The seal engaging portion 74 has a lead-in surface 78 and a rib engaging portion 80. The interior diameter of the rib engaging portion 80 is smaller than the outside diameter of the ribbed section 58 of the seal 50. The rib engaging portion 80 has one or more projections 82 and/or recesses 84 which cooperate with the ribbed section 58 to secure or lock the seal 50 in position in the seal engaging portion 74 of the terminal 70.

Figure 9:
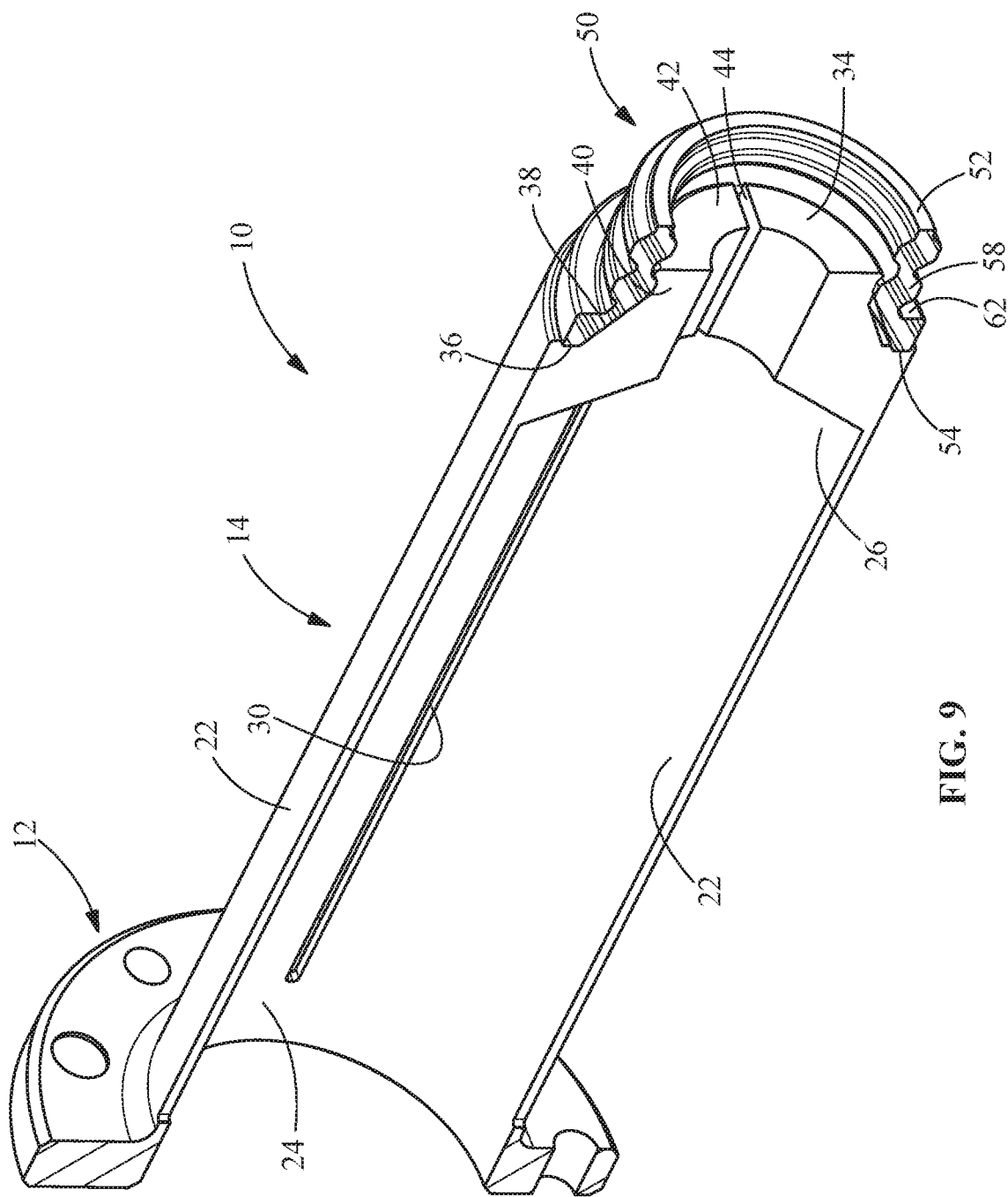
FIG. 9 is a cross-section view of a seal positioned on the gripper head prior to insertion into the terminal.

In use, the gripper head 10 is moved into engagement with the seal 50, wherein the gripping section 16 of the gripper head 10 is moved into the conductor receiving opening 56 of the seal 50. In this position, as shown in FIG. 9, the push surfaces 36 are proximate to or in engagement with the second end 54 of the seal; the angled surfaces 38 are proximate to or in engagement with the angles surface 60 of the seal; and the rib engaging surfaces 40 are in engagement with the ribbed section 58 of the seal 50.

As this occurs, the rib engaging surfaces 40 of the gripping section engage interior surface of the ribbed section 58 of the opening 56 of the seal 50. As the ribbed section 58 has a smaller interior diameter D1 than the rib engaging surfaces 40, the rib engaging surfaces 40 and the gripping legs 34 are forced toward each other. As the gripping section slots 44 are positioned between the gripping legs 34, each gripping leg 34 can move independently of the other gripping legs 34. As the gripping legs 34 are moved, the compliant legs 22 attached to the gripping legs 34 are compressed or forced to move toward each other, thereby resiliently deforming the compliant legs 22. As the compliant section slots 30 are positioned between the compliant legs 22, each compliant leg 22 can move independently of the other compliant legs 22. The resilient deformation of the compliant legs 22 causes the compliant legs 22 to attempt to return toward their unstressed position, which in turn causes the gripping legs 34 of the gripping section 16, and in particular, the rib engaging surfaces 40 portions to apply an outward force on the ribbed sections 58 of the seal 50. The outward force is sufficient to retain the seal 50 on the gripping section 16 of the gripper head 10.

Figure 10:
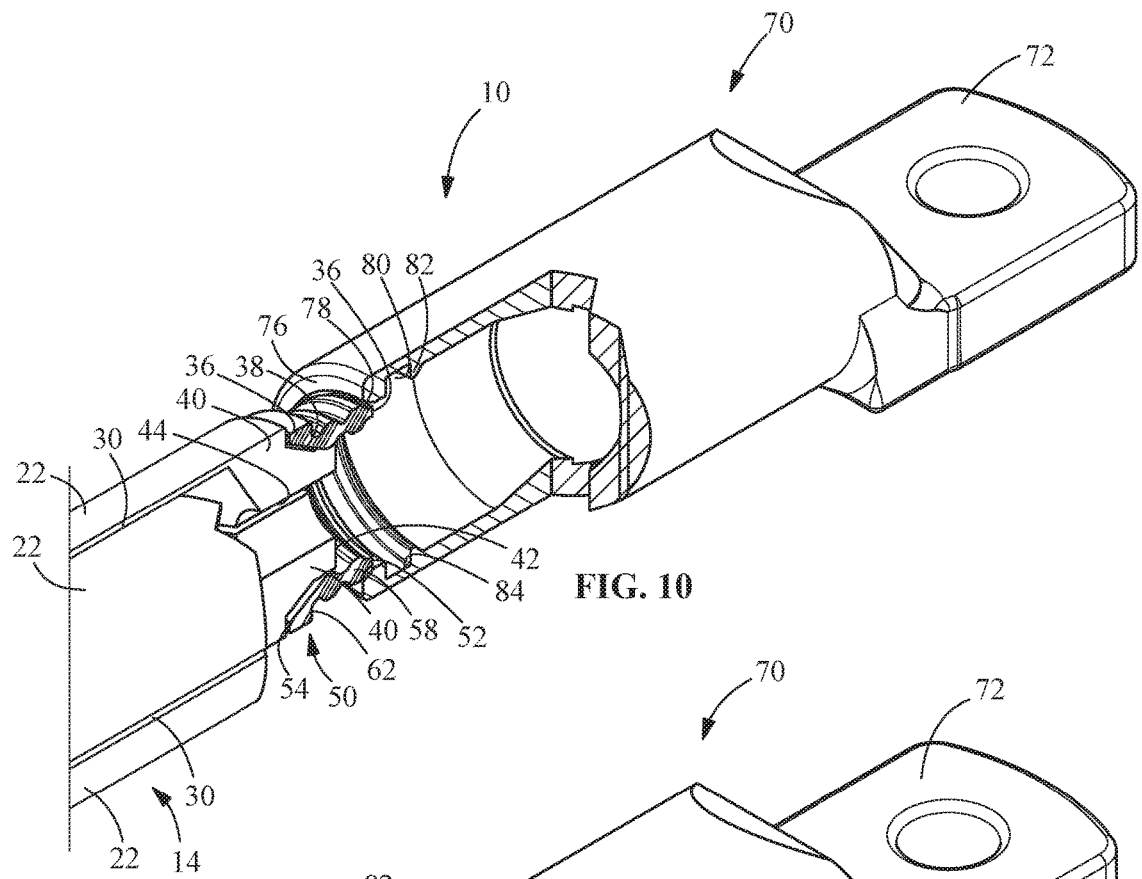
FIG. 10 is a cross-section view of the seal positioned on the gripper head as the seal is inserted into the terminal.

With the seal 50 properly positioned on the gripper head 10, the gripper head 10 and seal 50 are moved into position proximate the terminal 70. The gripper head 10 is then moved into the terminal 70, as shown in FIG. 10. During insertion, the push surface 36 of the gripper section 16 abuts the second end 54 of the seal 50. The push surface 36 facilitates the insertion of the seal 50 into the seal engaging portion 74 of the terminal 70 allowing any force or movement of the gripper head 10 in a direction parallel to the longitudinal axis of the gripper head 10 to be applied to the seal 50. This allows the ribbed section 58 of the seal 50 to be properly inserted into the rib engaging portion 80 of the seal engaging portion 74 of the terminal 70.

Figure 11:
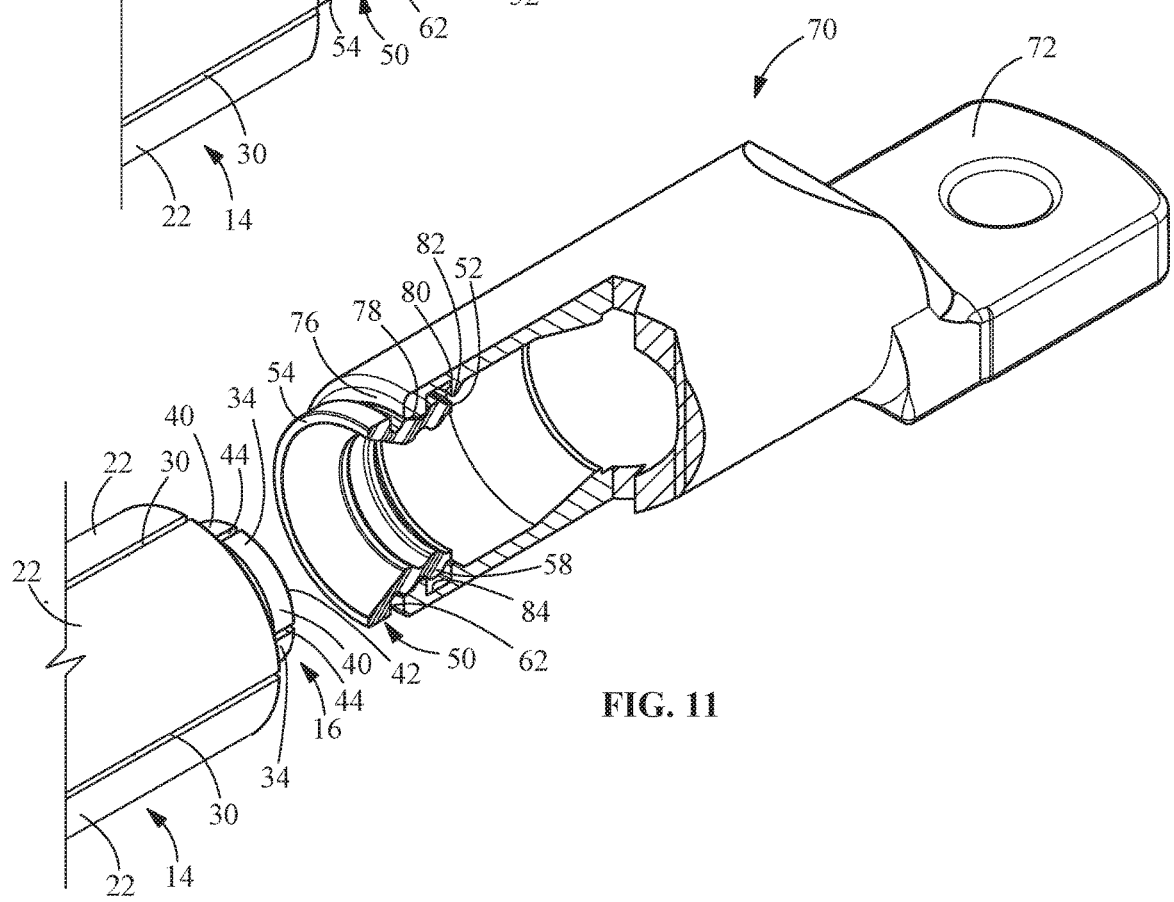
FIG. 11 is a cross-section view of the seal inserted into the terminal and the gripper head removed.

When fully inserted, the ribbed section 58 of the seal 50 engages and is compressed in the rib engaging portion 80 of the seal engaging portion 74 of the terminal 70. As the interior diameter of the seal engaging portion 74 is smaller than the outside diameter of the ribbed section 58 of the seal 50, a frictional or interference force is generated between the seal engaging portion 74 of the terminal 70 and the diameter of the ribbed section 58 of the seal 50. Due to the dimensions of the interior diameter of the seal engaging portion 74, the outside diameter of the ribbed section 58, the interior diameter of the ribbed section 58, and the diameter of the rib engaging surfaces 40, the frictional or interference force between the seal engaging portion 74 of the terminal 70 and the diameter of the ribbed section 58 of the seal 50 is greater than the outward force applied by the rib engaging surfaces 40 on the ribbed sections 58 of the seal 50. Consequently, with the seal 50 properly inserted into the terminal 70, the gripper head 10 can be withdrawn while leaving the seal 50 properly positioned, as shown in FIG. 11.

The gripper head 10 effectively picks up and inserts seals into terminals. As the gripper head 10 uses resilient and frictional forces, the complexity and cost of the gripper head 10 is greatly reduces over know gripper heads. The gripper head 10 is scalable and can be used for seals and terminals of varying sizes.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A gripper head for use in gripping a seal and positioning the seal in an electrical terminal, the gripper head comprising:
a mounting section;
a compliant section extending from the mounting section, the compliant section having compliant legs having fixed ends proximate the mounting section and free ends, the compliant legs are spaced apart by compliant section slots, a diameter of the compliant section being smaller than a diameter of the mounting section;
a gripping section extending from the compliant section, the gripping section having gripping legs extending from the compliant legs, the gripping legs being spaced apart by gripping section slots, the gripping legs having push surfaces, angled surfaces, engaging surfaces and end surfaces, the push surfaces extending from the compliant legs in a direction which is transverse to a longitudinal axis of the compliant section, the gripping legs being movable with the compliant legs and being movable relative to the mounting section;
wherein as the gripper head is moved into engagement with the seal, the gripping legs and the compliant legs are resiliently deformed causing the compliant legs and the gripping legs to apply a force to the seal to retain the seal on the gripping section of the gripper head;
wherein the push surfaces are configured to allow movement of the gripper head in a direction parallel to the longitudinal of the compliant portion to be applied to the seal to position the seal in the electrical terminal.

2. The gripper head as recited in claim 1, wherein the mounting section is a circular member which can be attached to a device.

3. The gripper head as recited in claim 1, wherein the fixed ends of the compliant legs are fixed relative to the mounting section and the free ends are movable relative to the mounting section, the free ends move in a direction which is essentially transverse to the longitudinal axis of the compliant section.

4. The gripper head as recited in claim 1, Wherein the compliant section has a general cylindrical configuration.

5. The gripper head as recited in claim 1, wherein the compliant section has four compliant legs.

6. The gripper head as recited ha claim 1, wherein the compliant legs are of equal size.

7. The gripper head as recited in claim 1, wherein the compliant section slots extend from proximate the mounting section to the free ends of the compliant legs.

8. The gripper head as recited in claim 1, wherein the engaging surfaces have a general cylindrical configuration, with a diameter of the engaging surfaces being smaller than a diameter of the compliant section.

9. The gripper head as recited in claim 1, wherein the number of gripping legs is equivalent to the number of compliant legs.

10. The gripper head as recited in claim 1, wherein the gripping section slots extend from proximate the compliant section to the end surfaces of the gripping legs, the gripping section slots are extension of the compliant section slots.

* * * * *